United States Patent
Kamogawa

(10) Patent No.: US 12,103,515 B2
(45) Date of Patent: Oct. 1, 2024

(54) VEHICLE BEHAVIOR DETERMINATION SYSTEM AND VEHICLE BEHAVIOR DETERMINATION METHOD

(71) Applicant: TOYOTA JIDOSHA KABUSHIKI KAISHA, Toyota Aichi-ken (JP)

(72) Inventor: Takahiro Kamogawa, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 230 days.

(21) Appl. No.: 17/832,926

(22) Filed: Jun. 6, 2022

(65) Prior Publication Data

US 2022/0410870 A1 Dec. 29, 2022

(30) Foreign Application Priority Data

Jun. 29, 2021 (JP) ................................. 2021-107685

(51) Int. Cl.
| | |
|---|---|
| *B60W 30/045* | (2012.01) |
| *B60W 10/20* | (2006.01) |
| *B60W 40/114* | (2012.01) |
| *B60W 50/14* | (2020.01) |

(52) U.S. Cl.
CPC .......... *B60W 30/045* (2013.01); *B60W 10/20* (2013.01); *B60W 40/114* (2013.01); *B60W 50/14* (2013.01); *B60W 2050/146* (2013.01); *B60W 2520/14* (2013.01)

(58) Field of Classification Search
CPC ............... B60W 30/045; B60W 10/20; B60W 40/114; B60W 40/10; B60W 50/14; B60W 2050/146; B60W 2520/14; B60W 2540/16; G07C 5/008; G07C 5/0808; G07C 5/085; H04L 67/12; H04W 4/38; H04W 4/44
USPC ....................................................... 701/41–44
See application file for complete search history.

(56) References Cited

U.S. PATENT DOCUMENTS

2020/0042805 A1 2/2020 Satomi et al.

FOREIGN PATENT DOCUMENTS

| JP | S63-034261 | A | 2/1988 | | |
| JP | H07-282307 | A | 10/1995 | | |
| JP | 2004114977 | * | 4/2004 | ............ | B60R 21/00 |
| JP | 3762854 | * | 4/2006 | ............ | B60R 21/00 |
| JP | 3762855 | * | 4/2006 | ............ | B60R 21/00 |
| JP | 2006-142844 | A | 6/2006 | | |
| JP | 3888180 | * | 2/2007 | ............ | B60R 21/00 |

(Continued)

*Primary Examiner* — Hai H Huynh
(74) *Attorney, Agent, or Firm* — Dinsmore & Shohl LLP

(57) ABSTRACT

Provided are a shift position sensor detecting a shift position of a vehicle; a yaw rate sensor detecting a yaw rate of the vehicle; a turning angle calculation unit calculating, based on the yaw rate between a start time and an end time of a first time, a turning angle of the vehicle in a plan view between the start time and the end time; and a determination unit determining that the vehicle executes a specific retreat operation when the determination unit determines, based on a detection value of the shift position sensor, that the shift position is switched to an advance position, a reverse position, and the advance position within the first time, and a maximum cumulative value of the turning angle of the vehicle in one direction between the start time and the end time, calculated by the turning angle calculation unit, is a threshold value or more.

18 Claims, 12 Drawing Sheets

(56) References Cited

FOREIGN PATENT DOCUMENTS

| JP | 4263534 | * | 5/2009 | ............. B60R 21/00 |
| JP | 2009-250965 A | | 10/2009 | |
| JP | 2010-047105 A | | 3/2010 | |
| JP | 2018-179131 A | | 11/2018 | |
| JP | 2019-055609 A | | 4/2019 | |

* cited by examiner

FIG. 1
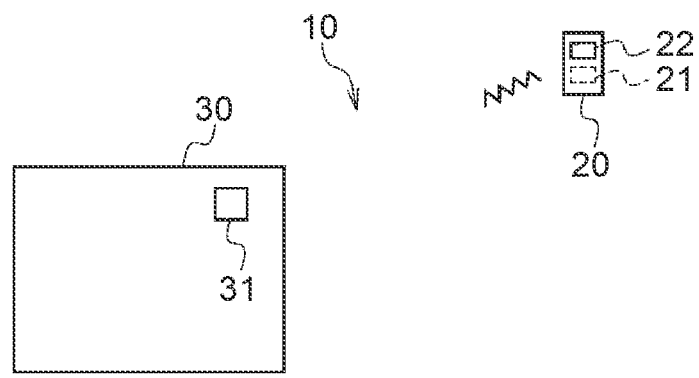
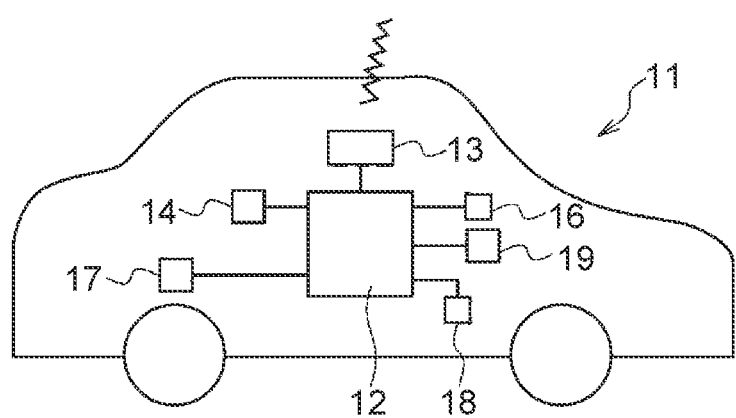

VEHICLE BEHAVIOR DETERMINATION SYSTEM AND VEHICLE BEHAVIOR DETERMINATION METHOD

CROSS-REFERENCE TO RELATED APPLICATION

This application claims priority to Japanese Patent Application No. 2021-107685 filed on Jun. 29, 2021, incorporated herein by reference in its entirety.

BACKGROUND

1. Technical Field

The disclosure relates to a vehicle behavior determination system and a vehicle behavior determination method.

2. Description of Related Art

Japanese Unexamined Patent Application Publication No. 2006-142844 (JP 2006-142844 A) discloses a vehicle that can detect a retreat operation of a vehicle when the vehicle executes the retreat operation.

SUMMARY

The disclosure in JP 2006-142844 A is unable to determine whether a vehicle has executed a prescribed specific retreat operation, including a plurality of advance operations, at least one retreat operation, and an operation to change direction at a predetermined angle or more within a prescribed time.

In view of the above fact, an object of the disclosure is to obtain a vehicle behavior determination system and a vehicle behavior determination method capable of determining whether a vehicle has executed a specific retreat operation, including a plurality of advance operations, at least one retreat operation, and an operation to change direction at a predetermined angle or more within a prescribed time.

A vehicle behavior determination system according to a first aspect includes a shift position sensor, a yaw rate sensor, a turning angle calculation unit, and a determination unit. The shift position sensor is configured to detect a shift position of a vehicle. The yaw rate sensor is configured to detect a yaw rate of the vehicle. The turning angle calculation unit is configured to calculate, based on the yaw rate during a period between a start time and an end time of a first time, a turning angle of the vehicle in a plan view during the period between the start time and the end time. The determination unit is configured to determine that the vehicle has executed a specific retreat operation, when it is determined based on a detection value of the shift position sensor that the shift position has been switched in order of an advance position, a reverse position, and the advance position within the first time, and a maximum cumulative value of the turning angle of the vehicle in one direction during the period between the start time and the end time, calculated by the turning angle calculation unit, is equal to or more than a threshold value.

The vehicle behavior determination system according to the first aspect includes the determination unit configured to determine that the vehicle has executed a specific retreat operation, when it is determined based on the detection value of the shift position sensor that the shift position has been switched in order of an advance position, a reverse position, and the advance position within the first time, and a maximum cumulative value of the turning angle of the vehicle in one direction during the period between the start time and the end time, calculated by the turning angle calculation unit, is equal to or more than a threshold value. Therefore, the vehicle behavior determination system according to the first aspect can determine whether the vehicle has executed the prescribed specific retreat operation, including a plurality of advance operations, at least one retreat operation, and an operation to change direction at a predetermined angle or more, within the first time.

In the vehicle behavior determination system in a second aspect of the disclosure according to the first aspect of the disclosure, the threshold value may be a value from 150° to 180°.

The determination unit in the second aspect of the disclosure may determine that the vehicle has executed the specific retreat operation, when the cumulative value of the turning angle of the vehicle in one direction during the period between the start time and the end time, calculated by the turning angle calculation unit, is equal to or more than a value between 150° and 180°. In other words, when the cumulative value of the turning angle of the vehicle in one direction is a very small value (less than the threshold value), the determination unit may not determine that the vehicle has executed the specific retreat operation. Therefore, the vehicle behavior determination system according to the second aspect can determine whether the vehicle has executed the specific retreat operation, including an operation to change direction at a predetermined angle or more, within the first time with a high accuracy.

In the vehicle behavior determination system in a third aspect of the disclosure according to the first aspect or the second aspect of the disclosure, the determination unit may determine that the shift position is in the reverse position when the shift position sensor detects that the shift position is in the reverse position and a vehicle speed of the vehicle is zero for a second time.

A driver who has an intention to perform the specific retreat operation typically performs rear confirmation for a certain period of time (second time) after setting the shift position to the reverse position. Therefore, when the driver sets the shift position to the reverse position, the vehicle speed is typically maintained at zero, and the shift position is set to the reverse position for the second time. In the third aspect of the disclosure, the determination unit may determine that the shift position is in the reverse position, when the shift position sensor detects that the shift position is in the reverse position and the vehicle speed of the vehicle is zero for the second time. Therefore, when the driver, who has no intension of performing the specific retreat operation, temporarily sets the shift position to the reverse position, it is less likely that the determination unit erroneously determines that the vehicle has performed the specific retreat operation. Therefore, the vehicle behavior determination system according to the third aspect can determine whether the vehicle has executed the specific retreat operation within the first time with a high accuracy.

In the vehicle behavior determination system in a fourth aspect of the disclosure according to any one of the first to third aspects of the disclosure, the determination unit may determine that the shift position is in the reverse position when the shift position sensor detects that the shift position is in the reverse position for a third time.

In the fourth aspect of the disclosure, the determination unit may not erroneously determine that the vehicle has performed the specific retreat operation, when, for example, the driver turns the vehicle (makes a turn) by a very small angle while setting the shift position to the reverse position for a short period of time that is less than the third time. Therefore, the vehicle behavior determination system according to the fourth aspect can determine whether the vehicle has executed the specific retreat operation within the first time with a high accuracy.

In the vehicle behavior determination system in a fifth aspect of the disclosure according to any one of the first to fourth aspects of the disclosure, the determination unit may not determine that the shift position is in an R range corresponding to the reverse position, when the vehicle is an automatic vehicle, the R range is located between a D range corresponding to the advance position and a P range, and the shift position is moved between the P range and the D range within a fourth time.

In the fifth aspect of the disclosure, when the shift position is temporarily set to the R range in order to move the shift position between the P range and the D range, the determination unit may not determine that the shift position is in the R range. Therefore, the vehicle behavior determination system according to the fifth aspect can determine whether the vehicle has executed the specific retreat operation within the first time with a high accuracy.

The vehicle behavior determination system in a sixth aspect of the disclosure according to any one of the first to fifth aspects of the disclosure may include a notification unit configured to notify a result of determination to a driver of the vehicle when the determination unit determines that the vehicle has executed the specific retreat operation a prescribed number of times or more while the vehicle is in a travelable state.

In the sixth aspect of the disclosure, the notification unit may notify the result of determination to the driver of the vehicle when the determination unit determines that the vehicle has executed the specific retreat operation a prescribed number of times or more while the vehicle is in the travelable state. Therefore, the vehicle behavior determination system in the sixth aspect can reduce the likelihood that the driver, who has received the notification regarding the determination result, executes the specific retreat operation thereafter.

A vehicle behavior determination method according to a seventh aspect includes the steps of: detecting a shift position of a vehicle; detecting a yaw rate of the vehicle; calculating, based on the yaw rate during a period between a start time and an end time of a first time, a turning angle of the vehicle in a plane view between the start time and the end time; and determining that the vehicle has executed a specific retreat operation, when it is determined that the shift position has been switched in order of an advance position, a reverse position, and the advance position within the first time, and a calculated maximum cumulative value of the turning angle of the vehicle in one direction during the period between the start time and the end time is equal to or more than a threshold value.

As described in the foregoing, the vehicle behavior determination system and the vehicle behavior determination method according to the disclosure have an effect of being able to determine whether a vehicle has executed a specific retreat operation, including a plurality of advance operations, at least one retreat operation, and an operation to change direction at a predetermined angle or more within a prescribed time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is an overall view of a vehicle behavior determination system according to an embodiment;

DETAILED DESCRIPTION OF EMBODIMENTS

Figure 2:
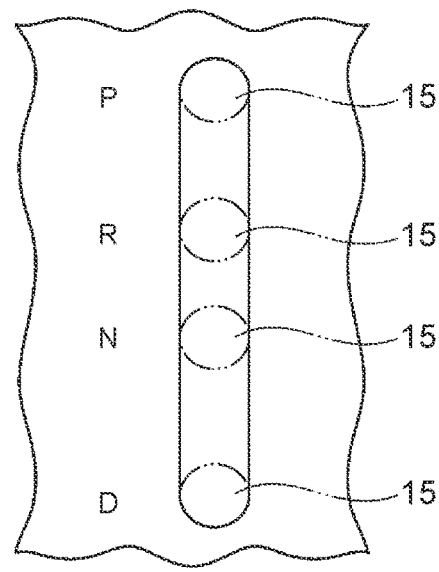
FIG. 2 is a schematic view of a shift lever installed on a vehicle shown in FIG. 1.

Hereinafter, an embodiment of a vehicle behavior determination system 10 (simply referred to as a system 10 below) and a vehicle behavior determination method according to the disclosure will be described with reference to the drawings.

FIG. 1 shows an overall configuration of the system 10 of the embodiment. The system 10 includes a vehicle 11, a mobile terminal 20, and an external server 30. The external server 30 is installed in a store of a taxi operation company that owns a plurality of vehicles 11, for example.

FIG. 1 shows one of the vehicles 11 owned by the taxi operation company. Each vehicle owned by the above taxi operation company has an ID that represents each individual vehicle.

The vehicle 11 includes an electronic control unit (ECU) 12, a wireless communication device 13, a GPS receiver 14, a shift lever 15, a shift position sensor 16, a vehicle speed sensor 17, a yaw rate sensor 18, and a display (notification unit) 19. The wireless communication device 13, the GPS receiver 14, the shift position sensor 16, the vehicle speed sensor 17, the yaw rate sensor 18, and the display 19 are connected to the ECU 12. The vehicle 11 further includes a steering wheel (illustration omitted). When the steering wheel is steered, a steering angle of front wheels (steered wheels) of the vehicle 11 changes.

Figure 3:
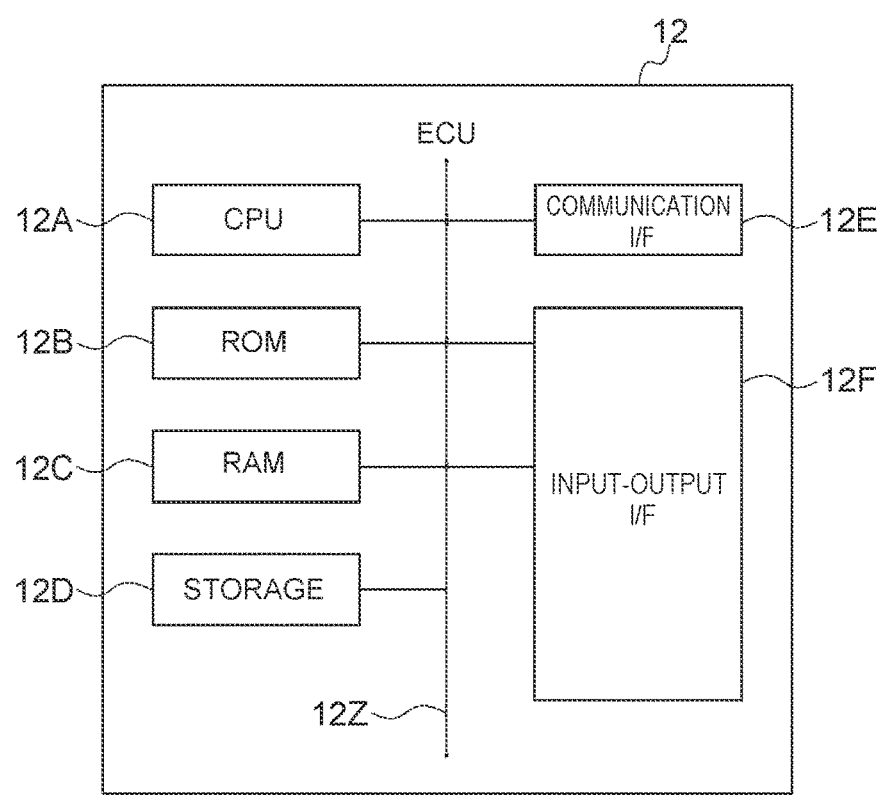
FIG. 3 is a control block diagram of an ECU of the vehicle.

As shown in FIG. 3, the ECU 12 has a configuration including a central processing unit (CPU: processor) 12A, a read-only memory (ROM) 12B, a random-access memory (RAM) 12C, a storage 12D, a communication interface (I/F) 12E, and an input-output I/F 12F. The CPU 12A, the ROM 12B, the RAM 12C, the storage 12D, the communication I/F 12E, and the input-output I/F 12F are communicably connected with each other through a bus 12Z. The ECU 12 can acquire information about date and time from a timer (illustration omitted).

The CPU 12A is a central processing unit that executes various programs and controls each unit. More specifically, the CPU 12A reads programs from the ROM 12B or the storage 12D, and executes the programs by using the RAM 12C as a work area. The CPU 12A controls each component member and performs various calculation processing according to the programs recorded in the ROM 12B or the storage 12D.

The ROM 12B stores various programs and various data. The RAM 12C functions as a work area to temporarily store programs or data. The storage 12D is constituted of a storage device, such as a hard disk drive (HDD) or a solid state drive (SSD) to store various programs and various data. The communication I/F 12E is an interface for communicating with other devices. The input-output I/F 12F is an interface for communicating with various devices.

The wireless communication device 13 can wirelessly communicate with a wireless communication device 21 in the mobile terminal 20 and a wireless communication device 31 in the external server 30.

The GPS receiver 14 repeatedly acquires position information (latitude, longitude, etc.) of the point at which the vehicle 11 is traveling, based on GPS signals transmitted from satellites, at a prescribed period.

The shift lever 15 shown in FIG. 2 can be moved to shift positions including a parking range (P range), a reverse range (R range) (reverse position), a neutral range (N range), and a drive range (D range) (advance range). In other words, the vehicle 11 is an automatic vehicle (AT vehicle).

The shift position sensor 16 shown in FIG. 1 repeatedly acquires the shift position of the shift lever 15 at a prescribed period. Upon reception of a signal representing the shift position from the shift position sensor 16, the ECU 12 changes a shift stage (gear) of a transmission (illustration omitted) provided in the vehicle 11. Specifically, when the shift position is in the D range, the shift stage of the transmission functions as an advancing gear. When the shift position is in the R range, the shift stage of the transmission functions as a retreat gear. When the shift position is in the N range, the transmission is in a neutral state. When the shift position is in the P range, the transmission is in a parking state.

The vehicle speed sensor 17 detects the vehicle speed of the vehicle 11.

The yaw rate sensor 18 detects the yaw rate of the vehicle 11.

The display 19 with a touch panel is provided on an instrument panel (illustration omitted) of the vehicle 11.

The wireless communication device 13 and the GPS receiver 14 repeatedly transmit the received information to the ECU 12 at a prescribed period. The shift position sensor 16, the vehicle speed sensor 17, and the yaw rate sensor 18 repeatedly transmit information about the detection values to the ECU 12 at a prescribed period. The display 19 transmits information that is input using the touch panel to the ECU 12.

Figure 4:
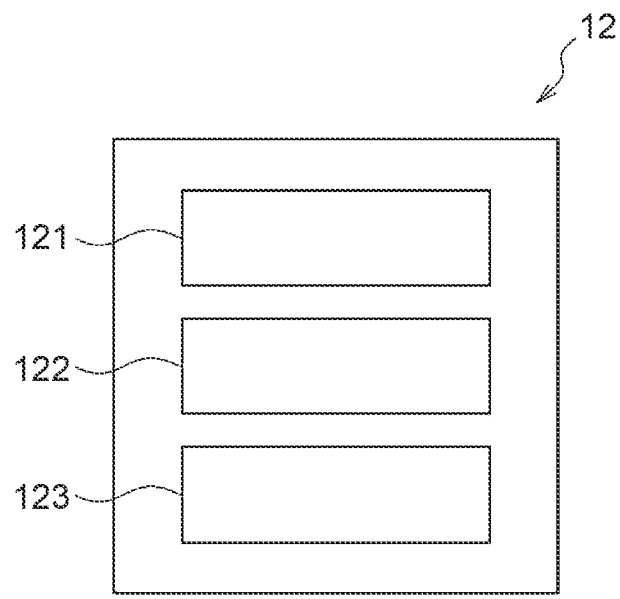
FIG. 4 is a functional block diagram of the ECU shown in FIG. 3.

In FIG. 4, an example of the functional configuration of the ECU 12 is shown in the form of a block diagram. The ECU 12 includes a turning angle calculation unit 121, a wireless control unit 122, and a display unit controller 123 as a function configuration. The turning angle calculation unit 121, the wireless control unit 122, and the display unit controller 123 are implemented when the CPU 12A reads and executes programs stored in the ROM 12B.

The turning angle calculation unit 121 calculates a turning angle of the vehicle 11 in a plan view, based on information about the yaw rate of the vehicle 11 transmitted from the yaw rate sensor 18. The vehicle 11 can turn clockwise and counterclockwise in a plan view. The turning angle calculation unit 121 calculates a turning angle while distinguishing turning directions of the vehicle 11.

The wireless control unit 122 controls the wireless communication device 13. Specifically, the wireless control unit 122 controls the wireless communication device 13 such that the wireless communication device 13 executes wireless communication with the external server 30 (wireless communication device 31) and the mobile terminal 20 (wireless communication device 21).

The display unit controller 123 controls the display 19. Specifically, the display unit controller 123 displays on the display 19 the information received by the wireless communication device 13 from the mobile terminal 20 (wireless communication device 21) and the external server 30 (wireless communication device 31), as well as the information input via the touch panel on the display 19.

The mobile terminal 20 shown in FIG. 1 is owned by the driver who is a user of the system 10. The mobile terminal 20 includes the wireless communication device 21 that can perform wireless communication with the wireless communication device 13 in the vehicle 11 and the wireless communication device 31 in the external server 30. The mobile terminal 20 includes a display (notification unit) 22 with a touch panel. The mobile terminal 20 has a configuration including a CPU, a ROM, a RAM, a storage, a communication I/F, and an input-output I/F. The CPU, the ROM, the RAM, the storage, the communication I/F, and the input-output I/F are communicably connected with each other through a bus. The mobile terminal 20 can acquire information about date and time from a timer (illustration omitted). In addition, a driving diagnostic application, which is software created by the taxi operation company, is installed on the mobile terminal 20.

Figure 5:
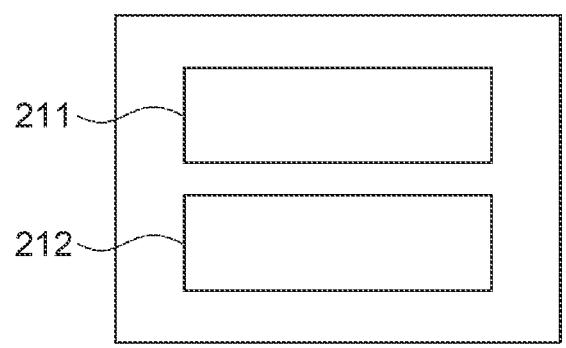
FIG. 5 is a functional block diagram of a mobile terminal shown in FIG. 1.

In FIG. 5, an example of the functional configuration of the mobile terminal 20 is shown in the form of a block diagram. The mobile terminal 20 includes a wireless control unit 211, a display unit controller 212 as a function configuration. The wireless control unit 211 and the display unit controller 212 are implemented when the CPU reads and executes programs stored in the ROM.

The wireless control unit 211 controls the wireless communication device 21. Specifically, the wireless control unit 211 controls the wireless communication device 21 such that the wireless communication device 21 executes wireless communication with the vehicle 11 (wireless communication device 13) and the external server 30 (wireless communication device 31).

The display unit controller 212 controls the display 22. Specifically, the display unit controller 212 displays on the display 22 the information received by the wireless communication device 21 from the vehicle 11 (wireless communication device 13) and the external server 30 (wireless communication device 31), as well as the information input via the touch panel of the mobile terminal 20, for example.

The external server 30 shown in FIG. 1 has a configuration including a CPU, a ROM, a RAM, a storage, a communication I/F, and an input-output I/F. The CPU, the ROM, the RAM, the storage, the communication I/F, and the input-output I/F in the external server 30 are communicably connected with each other through a bus. The external server 30 can acquire information about date and time from a timer (illustration omitted).

Figure 6:
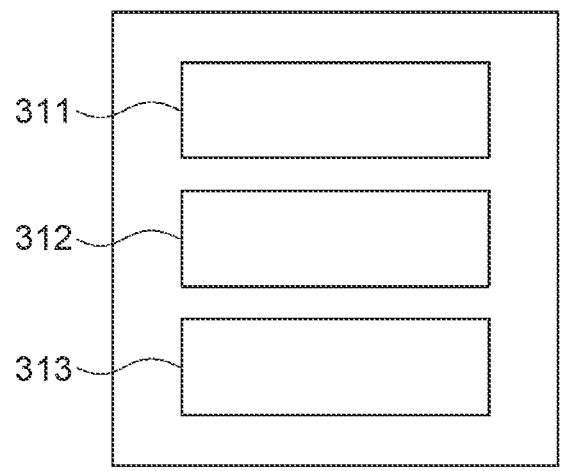
FIG. 6 is a functional block diagram of an external server shown in FIG. 1.

In FIG. 6, an example of the functional configuration of the external server 30 is shown in the form of a block diagram. The external server 30 includes a determination unit 311, a count unit 312, and a wireless control unit 313 as a function configuration. The determination unit 311, the count unit 312, and the wireless control unit 313 are implemented when the CPU in the external server 30 reads and executes programs stored in the ROM.

As will be described later, the determination unit 311 determines whether the vehicle 11 has executed a specific retreat operation, based on vehicle speed detected by the vehicle speed sensor 17, a shift position of the shift lever 15 detected by the shift position sensor 16, a (maximum) cumulative value of the turning angle of the vehicle 11 in a plan view calculated by the turning angle calculation unit 121 in the ECU 12, and a threshold value described later. The specific retreat operation is an operation of the vehicle 11 in which the vehicle 11 performs a plurality of advance operations and at least one retreat operation within a prescribed first time and the maximum cumulative value of the turning angle of the vehicle 11 in one direction within the first time is equal to or more than the threshold value. As will be described later, the first time is two minutes, for example.

The count unit 312 starts to count the first time, when the shift lever 15 is moved to the D range under a prescribed condition as will be described later. The count unit 312 counts time from a start time of the first time until the first time elapses. Note that the time when the first time elapses is an end time.

The wireless control unit 313 controls the wireless communication device 31 in the external server 30. Specifically, the wireless control unit 313 controls the wireless communication device 31 such that the wireless communication device 31 executes wireless communication with the vehicle 11 (wireless communication device 13) and the mobile terminal 20 (wireless communication device 21).

Function and Effect

Next, the function and effect of the present embodiment will be described.

Figure 7:
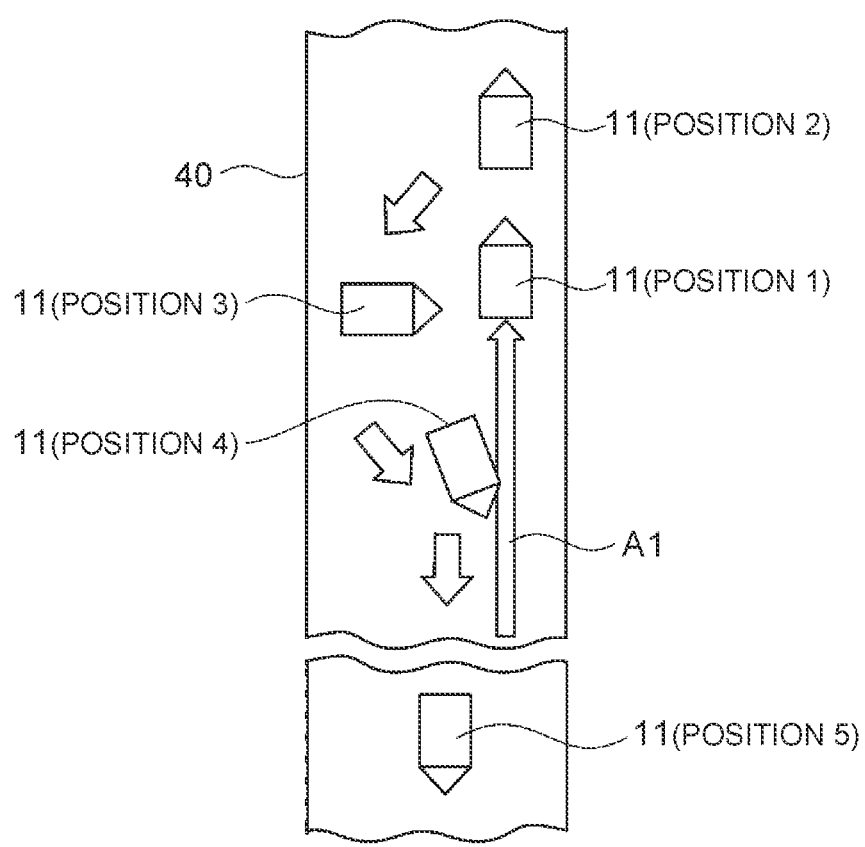
FIG. 7 is a schematic diagram showing how the vehicle executes a prescribed operation.

Case of FIG. 7

Next, the operations of the vehicle 11, the mobile terminal 20, and the external server 30 when the vehicle 11 executes the operation shown in FIG. 7 will be described with flowcharts in FIGS. 16 to 18.

During the period from turn-on to turn-off of an ignition switch (IG-SW, illustration of which is omitted) of the vehicle 11, data representing the status of the IG-SW, data representing the detection values of the shift position sensor 16 and the vehicle speed sensor 17, and data representing the calculation value of the turning angle calculation unit 121 (the turning angle of the vehicle 11) are repeatedly transmitted from the wireless communication device 13 to the wireless communication device 31 in the external server 30. Hereinafter, these pieces of data are referred to as vehicle data. The vehicle data includes information about the time when each piece of the vehicle data is acquired and position information that represents locations. Here, in the case where the vehicle 11 includes a start switch (illustration omitted) in place of the IG-SW, the vehicle data (data representing the status of the start switch, data representing the detection values of the shift position sensor 16 and the vehicle speed sensor 17, and data representing the calculation value of the turning angle calculation unit 121) is repeatedly transmitted from the wireless communication device 13 to the wireless communication device 31 during the period from turn-on to turn-off of the start switch at a prescribed period. Note that the vehicle 11 is in a travelable state, when the IG-SW or the start switch is in ON state.

Figure 16:
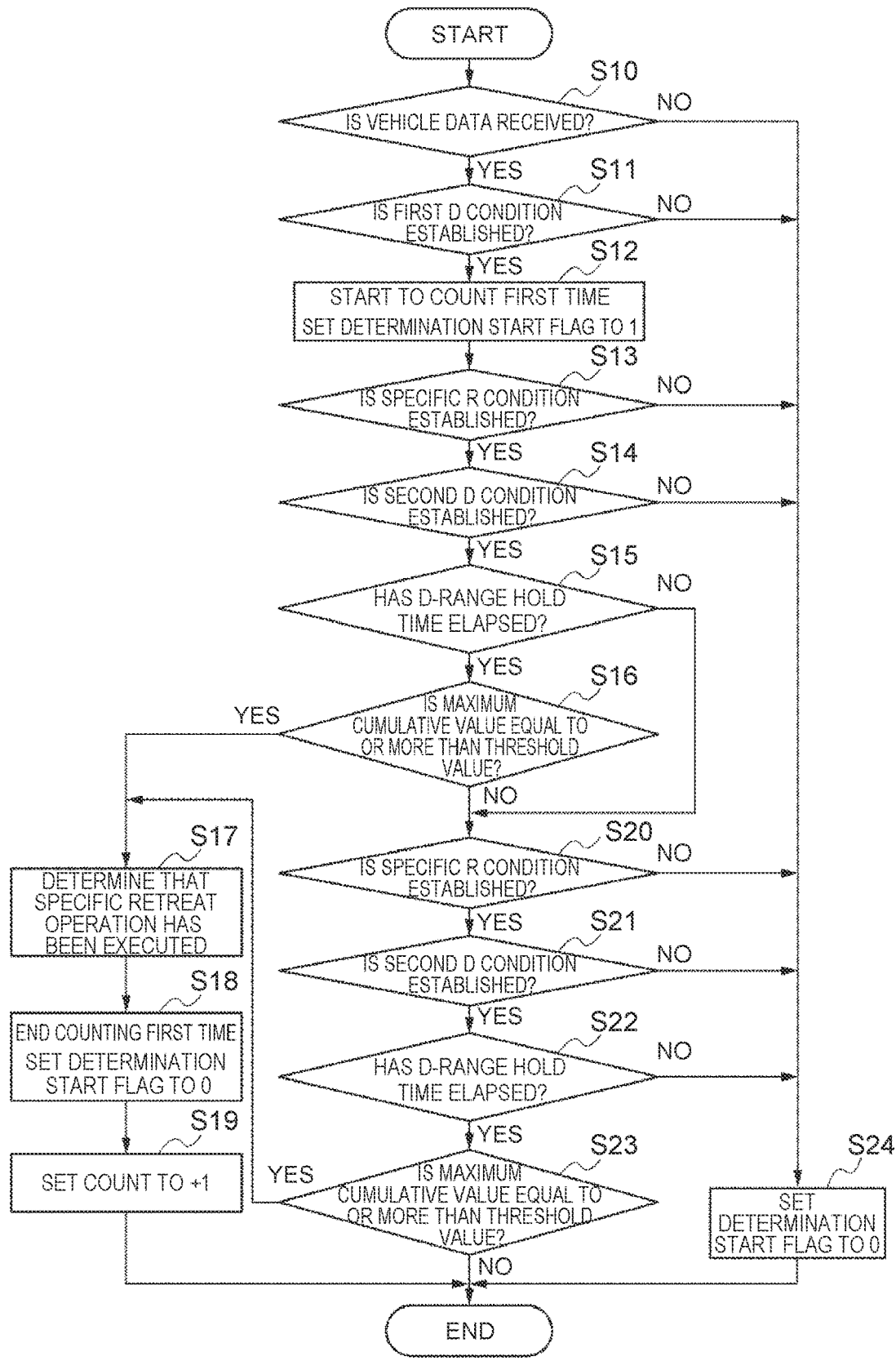
FIG. 16 is a flowchart showing processing executed by the external server.

The (CPU of the) external server 30 executes processing shown in the flowchart in FIG. 16 whenever a prescribed time elapses.

In step S10, the wireless control unit 313 in the external server 30 determines whether the wireless communication device 31 has received vehicle data from the wireless communication device 13 in the vehicle 11. When "Yes" is determined in step S10, the external server 30 proceeds to step S11.

In step S11, the determination unit 311 in the external server 30 determines whether a prescribed first D condition is established. The first D condition is established when all of the following conditions 1 to 3 are established.

Condition 1: the value of a determination start flag is "0". An initial value of the determination start flag is "0".

Condition 2: the detection value of the shift position sensor 16 indicates that the shift lever 15 of the vehicle 11 is positioned in the D range for a prescribed third time. For example, the third time is five seconds.

Condition 3: the detection value of the vehicle speed sensor 17 indicates that the vehicle speed is other than zero during a time period when the shift lever 15 is positioned in the D range. However, the vehicle speed may temporarily be zero during the time period.

Figure 8:
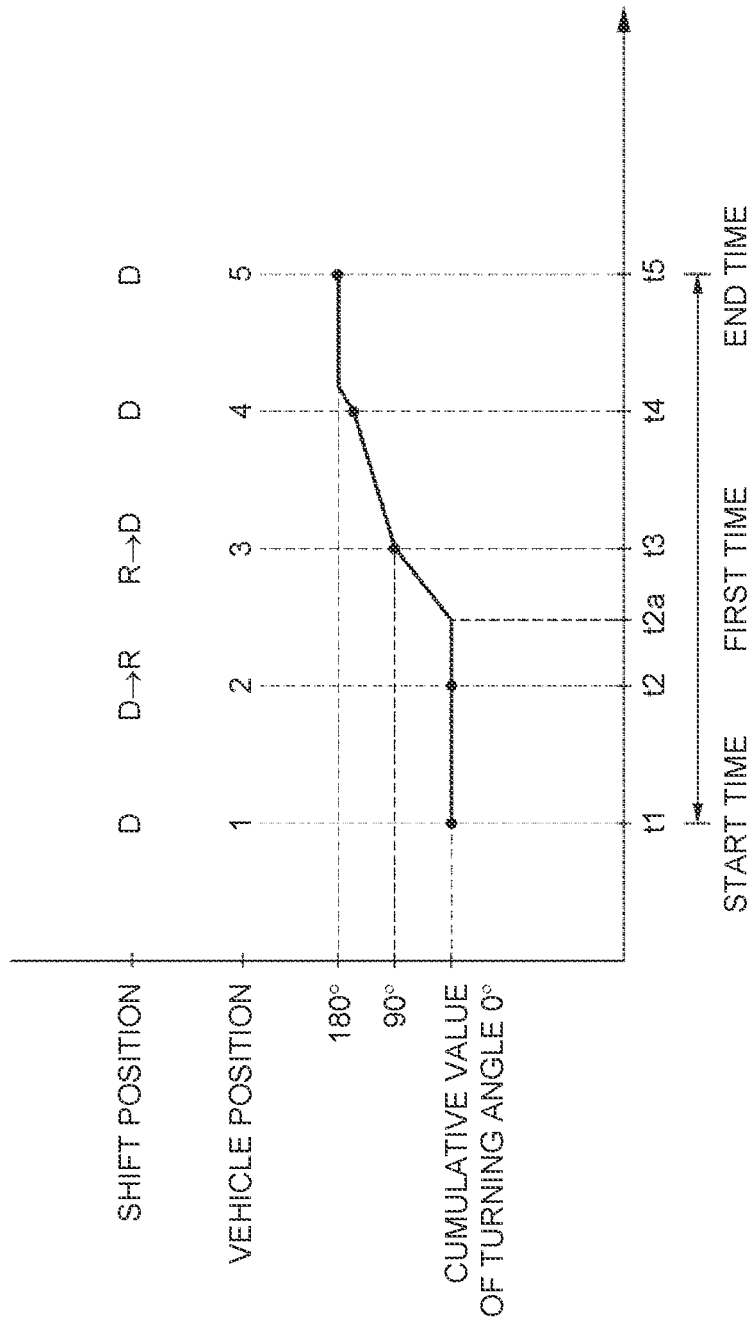
FIG. 8 is a timing chart when the vehicle executes the operation shown in FIG. 7.

The vehicle 11 shown in FIG. 7 advances on a straight road 40 along arrow A1, and positions at a position 1 shown in FIG. 7 at time t1 shown in FIG. 8. Note that in FIGS. 7, 9 and FIGS. 11 to 15, a front end portion of the vehicle 11 is depicted as a triangle. The vehicle 11 stops at a position 2 in FIG. 7 at time t2. The time from t1 to t2 is longer than the third time, and the shift lever 15 is positioned in the D range during the time from t1 to t2. Furthermore, during the time from t1 to t2, the vehicle speed detected by the vehicle speed sensor 17 is larger than zero. Furthermore, during the time from t1 to t2, the value of the determination start flag is set to "0". Therefore, the determination unit 311 determines that the first D condition is established in step S11. In this case, the determination unit 311 determines that the shift lever 15 is positioned in the D range. In short, the determination unit 311 determines "Yes" in step S11.

When "Yes" is determined in step S11, the external server 30 proceeds to step S12, where the count unit 312 starts to count a first time. The first time is two minutes, for example. In this case, the time to start counting is time t1 in FIG. 8. Specifically, at time t2, the count unit 312 starts to count the time elapsed since time t1 (start time). In step S12, the determination unit 311 further sets the value of the determination start flag to "1".

After the processing of step S12 ends, the wireless control unit 313 proceeds to step S13 to determine whether a prescribed specific R condition is established. The specific R condition is established when all of the following conditions 4 to 7 are established.

Condition 4: the detection value of the shift position sensor 16 indicates that the shift lever 15 is positioned in the R range for the third time.

Condition 5: the detection value of the vehicle speed sensor 17 indicates that the vehicle speed is zero and the detection value of the shift position sensor 16 indicates that the shift lever 15 is positioned in the R range for a second time that is shorter than the third time. The second time is three seconds, for example.

Condition 6: the vehicle speed is other than zero during a time period when the shift lever 15 is positioned in the R range. However, the vehicle speed may temporarily be zero during the time period.

Condition 7: the shift position changes from the D range to the R range within the first time.

When the vehicle 11 moves to the position 2 in FIG. 7, the driver of the vehicle 11 moves the shift lever 15 to the R range and places the shift lever 15 in the R range during the time from t2 to t3 in FIG. 8. The time from t2 to t3 is longer than the third time. Furthermore, the vehicle speed of the vehicle 11 is maintained at zero during the time from t2 to t2a. The time from t2 to t2a corresponds to the second time that is shorter than the third time. During the second time, the driver performs rear confirmation. At time t2a, the driver steers the steering wheel counterclockwise and releases his foot from a brake pedal (illustration omitted). As a result, the vehicle 11 experiences a creep phenomenon, so that the vehicle 11 retreats while turning, and stops at a position 3 in FIG. 7 at time t3. In other words, the vehicle speed is other than zero while the shift lever 15 is positioned in the R range. Furthermore, time t2 comes before the first time elapses. Therefore, the determination unit 311 determines that the specific R condition is established in step S13. In this case, the determination unit 311 determines that the shift lever 15 is positioned in the R range. In short, the determination unit 311 determines "Yes" in step S13, and proceeds to step S14. Note that the cumulative value of the clockwise (one-directional) turning angle of the vehicle 11 during the time from t2a to t3 is 90° as shown in FIG. 8.

When the vehicle 11 moves to the position 3 in FIG. 7, the driver of the vehicle 11 moves the shift lever 15 from the R range to the D range, and places the shift lever 15 in the D range during the time from t3 to t5 in FIG. 8. Furthermore, at time t3, the driver steers the steering wheel clockwise and releases his foot from the brake pedal. As a result, the vehicle 11 experiences a creep phenomenon, so that the vehicle 11 advances while turning. The vehicle 11 reaches a position 4 at time t4. At time t4, the driver returns the steering wheel to its initial position (neutral position) and presses the accelerator pedal (illustration omitted). Accordingly, the vehicle 11 advances along the road 40 and reaches a position 5 at time t5.

In step S14, the determination unit 311 determines whether a prescribed second D condition is established. The second D condition is established when the conditions 2, 3 are established.

The time from t3 to t5 in FIG. 8 is longer than the third time, and the shift lever 15 is positioned in the D range during the time from t3 to t5. Furthermore, during the time from t3 to t5, the vehicle speed of the vehicle 11 is larger than zero. Therefore, the determination unit 311 determines that the second D condition is established in step S14. In this case, the determination unit 311 determines that the shift lever 15 is positioned in the D range. In short, the determination unit 311 determines "Yes" in step S14, and proceeds to step S15.

Note that the cumulative value of the clockwise (one-directional) turning angle of the vehicle 11 during the time from t3 to t5 is 90° as shown in FIG. 8. Specifically, the maximum cumulative value of the clockwise (one-directional) turning angle of the vehicle 11 during the time from t1 to t5 is 180°.

The determination unit 311 proceeds to S15 to determine whether a prescribed D-range hold time has elapsed since the shift lever 15 was moved to D-range at time t3. For example, the D-range hold time is 60 seconds. The time from t3 to t5 in FIG. 8 is longer than the D-range hold time. Accordingly, the determination unit 311 determines "Yes" in step S15, and proceeds to step S16.

In step S16, the determination unit 311 determines whether the maximum cumulative value of the clockwise (one-directional) turning angle of the vehicle 11 during the time from t1 to time t5 is equal to or more than the threshold value. For example, the threshold value is recorded in the ROM of the external server 30. For example, the threshold value is 150°. As described above, the maximum cumulative value of the clockwise (one-directional) turning angle of the vehicle 11 during the time from t1 to t5 is 180°. Accordingly, the determination unit 311 determines "Yes" in step S16, and proceeds to step S17.

In step S17, the determination unit 311 determines that vehicle 11 has executed the specific retreat operation.

Then, in step S18, the count unit 312 ends counting of the first time. As described above, time t5 in FIG. 8 is the time when the first time ends. In step S18, the determination unit 311 further sets the value of the determination start flag to "0".

After the processing of step S18 ends, the external server 30 proceeds to step S19, where the determination unit 311 increments a count value of the specific retreat operation counter by "1".

When the processing of step S19 is ended, the external server 30 temporarily ends the processing of the flowchart in FIG. 16. Note that when "No" is determined in steps S10, S11, S13, S14, and S20 to S22, the external server 30 sets the determination start flag to "0" in step S24.

Figure 17:
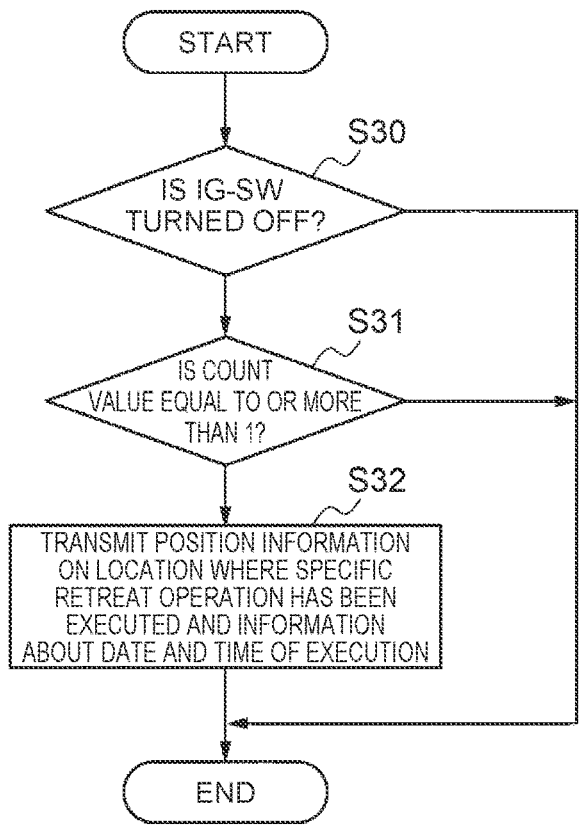
FIG. 17 is a flowchart showing processing executed by the external server.

The (CPU of the) external server 30 further executes the processing shown in the flowchart in FIG. 17 whenever a prescribed time elapses.

In step S30, the wireless control unit 313 of the external server 30 determines whether the information transmitted from the wireless communication device 13 includes information indicating that the IG-SW (or the start switch) of the vehicle 11 has been turned off.

When "Yes" is determined in step S30, the external server 30 proceeds to step S31, and the determination unit 311 determines whether the count value of the specific retreat operation counter is equal to or more than one.

When "Yes" is determined in step S31, the external server 30 proceeds to step S32, where the wireless communication device 31 controlled by the wireless control unit 313 transmits position information on the location of execution of the specific retreat operation determined to have been executed and information about date and time of the execution to the mobile terminal 20 (wireless communication device 21).

When the processing of step S32 is ended or when "No" is determined in steps S30, S31, the external server 30 temporarily ends the processing of the flowchart in FIG. 17.

Figure 18:
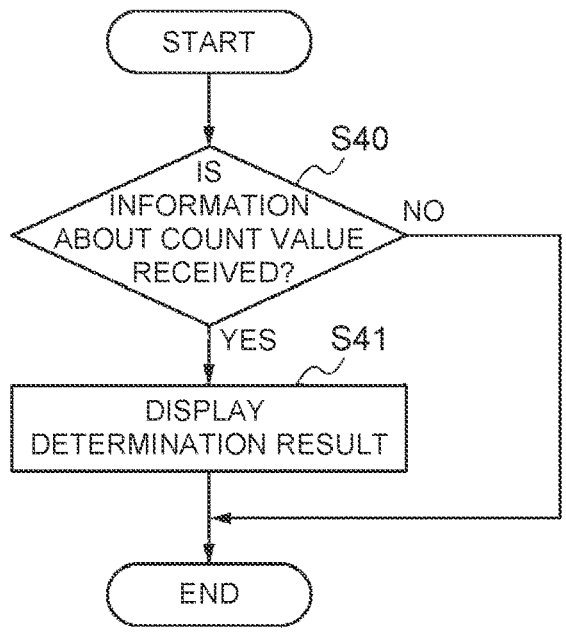
FIG. 18 is a flowchart showing processing executed by the mobile terminal.

Furthermore, the mobile terminal 20, in which the driving diagnostic application is active, executes the processing shown in the flowchart in FIG. 18 whenever a prescribed time elapses.

In step S40, the wireless control unit 211 of the mobile terminal 20 determines whether the wireless communication device 21 has received information about a count value of a retreat operation counter in the state where the vehicle 11 is travelable from the wireless communication device 31.

When "Yes" is determined in step S40, the mobile terminal 20 proceeds to step S41, where the display unit controller 212 controls the display 22 to display on the display 22 the result of determination by the determination unit 311. For example, the display 22 displays map information (illustration omitted) including position information representing the location of execution of the specific retreat operation determined to have been executed and information representing date and time of the execution of the specific retreat operation determined to have been executed.

When the processing of step S41 is ended or when "No" is determined in steps S40, the mobile terminal 20 temporarily ends the processing of the flowchart in FIG. 18.

Figure 9:
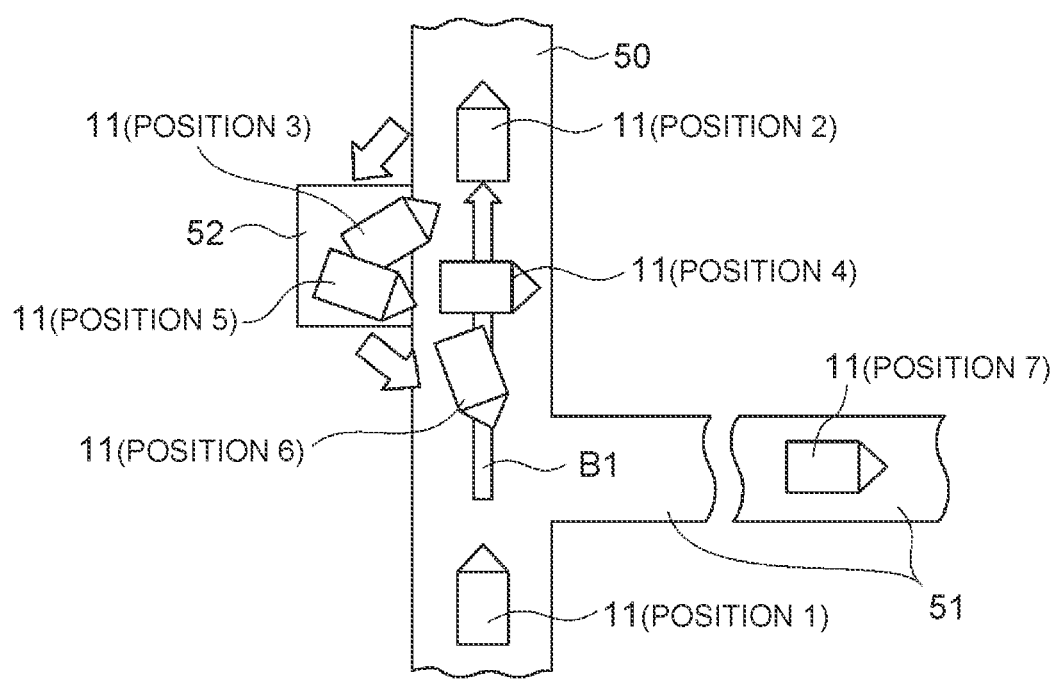
FIG. 9 is a schematic diagram showing how the vehicle executes a prescribed operation.

Case of FIG. 9

Next, the operations of the vehicle 11, the mobile terminal 20, and the external server 30 when the vehicle 11 executes the operation shown in FIG. 9 will be described with flowcharts in FIGS. 16 to 18. A straight road 50 shown in FIG. 9 is connected to one end of a straight road 51 crossing the road 50. In addition, there is an evacuation space 52 at a side edge portion of the road 50 to allow the vehicle 11 to enter. In the description below, the same operations (processing) as in the case of FIG. 7 are omitted.

The (CPU of the) external server 30 executes processing shown in the flowchart in FIG. 16 whenever a prescribed time elapses.

Figure 10:
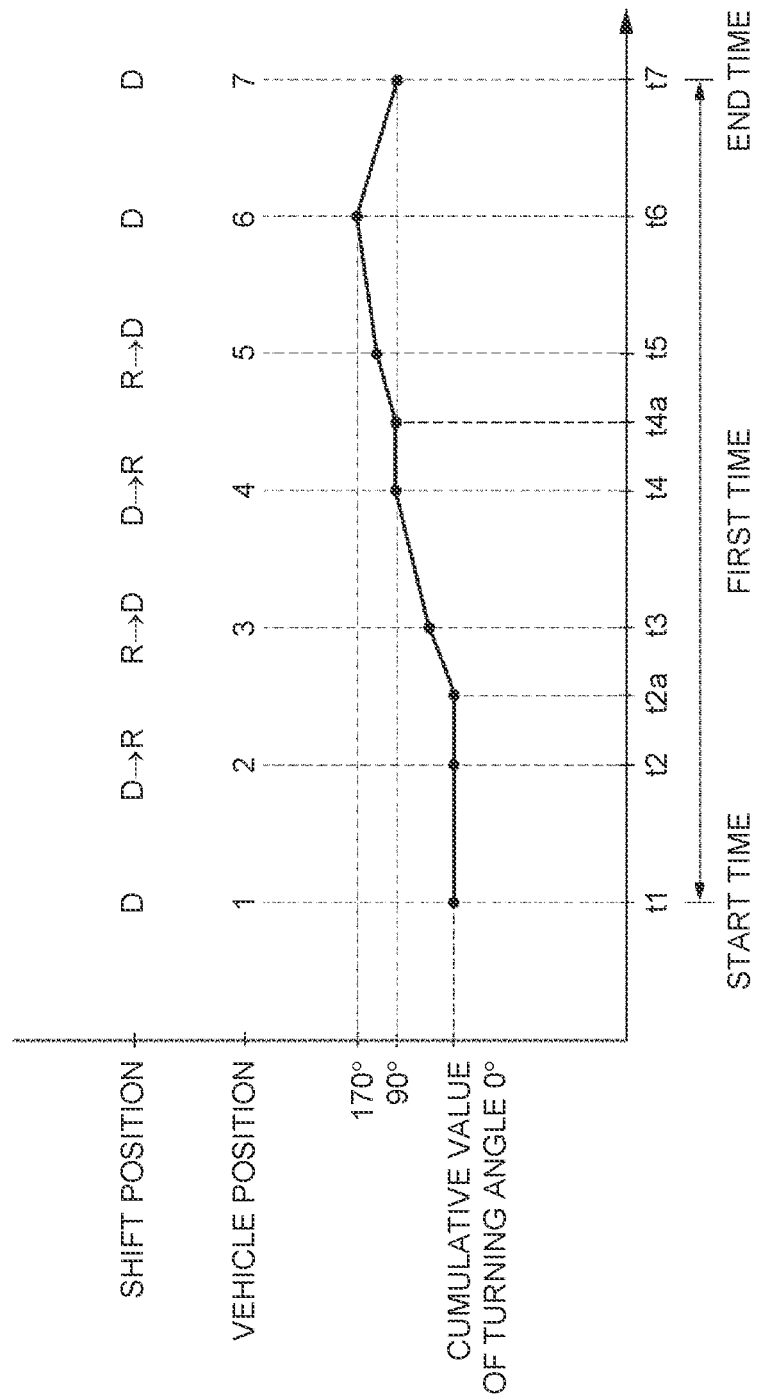
FIG. 10 is a timing chart when the vehicle executes the operation shown in FIG. 9.

The vehicle 11 shown in FIG. 9 advances on the straight road 50 along arrow B1, and positions at a position 1 shown in FIG. 9 at time t1 shown in FIG. 10. The vehicle 11 stops at a position 2 in FIG. 9 at time t2. The time from t1 to t2 is longer than the third time, and the shift lever 15 is positioned in the D range during the time from t1 to time t2. Furthermore, during the time from t1 to t2, the vehicle speed of the vehicle 11 is larger than zero. Furthermore, during the time from t1 to t2, the value of the determination start flag is set to "0". Therefore, the determination unit 311 determines that the first D condition is established in step S11 and the shift lever 15 is positioned in the D range. In short, the determination unit 311 determines "Yes" in step S11.

Then, the count unit 312 in the external server 30 starts to count the first time in step S12. In this case, the time to start counting is time t1 in FIG. 10. In step S12, the determination unit 311 further sets the value of the determination start flag to "1".

After the processing of step S12 ends, the determination unit 311 proceeds to step S13. When the vehicle 11 moves to a position 2 in FIG. 9, the driver of the vehicle 11 moves the shift lever 15 to the R range and places the shift lever 15 in the R range during the time from t2 to t3 in FIG. 10. The time from t2 to t3 is longer than the third time. Furthermore, the vehicle speed of the vehicle 11 is maintained at zero during the time from t2 to t2a. The time from t2 to t2a corresponds to the second time. During the second time, the driver performs rear confirmation. Furthermore, at time t2a, the driver steers the steering wheel counterclockwise and releases his foot from the brake pedal. As a result, the vehicle 11 experiences a creep phenomenon, so that the vehicle 11 retreats while turning, and stops at a position 3 in FIG. 9 at time t3. In other words, the vehicle speed is other than zero while the shift lever 15 is positioned in the R range. Moreover, time t2 comes before the first time elapses. Therefore, the determination unit 311 determines that the specific R condition is established in step S13 and the shift lever 15 is positioned in the R range. In short, the determination unit 311 determines "Yes" in step S13, and proceeds to step S14.

When the vehicle 11 moves to the position 3 in FIG. 9, the driver of the vehicle 11 moves the shift lever 15 from the R range to the D range, and places the shift lever 15 in the D range during the time from t3 to t4 in FIG. 10. Furthermore, at time t3, the driver steers the steering wheel clockwise and releases his foot from the brake pedal. As a result, the vehicle 11 experiences a creep phenomenon, so that the vehicle 11 advances while turning.

The time from t3 to t4 in FIG. 10 is longer than the third time, and the shift lever 15 is positioned in the D range during the time from t3 to t4. Furthermore, during the time from t3 to t4, the vehicle speed of the vehicle 11 is larger than zero. Accordingly, the determination unit 311 determines "Yes" in step S14 and proceeds to step S15.

In step S15, the determination unit 311 determines whether a prescribed D-range hold time has elapsed since the shift lever 15 was moved to the D range at time t3. The time from t3 to t4 in FIG. 8 is shorter than the D-range hold time. Accordingly, the determination unit 311 determines No in step S15, and proceeds to step S20. Note that the cumulative value of the clockwise (one-directional) turning angle of the vehicle 11 during the time from t1 to t4 is 90° as shown in FIG. 10.

The processing of step S20 is identical to that of step S13. When the vehicle 11 moves to a position 4 in FIG. 9, the driver of the vehicle 11 moves the shift lever 15 to the R range and places the shift lever 15 in the R range during the time from t4 to t5 in FIG. 10. The time from t4 to t5 is longer than the third time. Furthermore, the vehicle speed of the vehicle 11 is maintained at zero during the time from t4 to t4a. The time from t4 to t4a corresponds to the second time. During the second time, the driver performs rear confirmation. Furthermore, at time t4a, the driver steers the steering wheel counterclockwise and releases his foot from the brake pedal. As a result, the vehicle 11 experiences a creep phenomenon, so that the vehicle 11 retreats while turning, and stops at a position 5 in FIG. 9 at time t5. In other words, the vehicle speed is other than zero while the shift lever 15 is positioned in the R range. Moreover, time t4 comes before the first time elapses. Accordingly, the determination unit 311 determines "Yes" in step S20, and proceeds to step S21.

The processing of step S21 is identical to that of step S14. When the vehicle 11 moves to the position 5 in FIG. 9, the driver of the vehicle 11 moves the shift lever 15 from the R range to the D range, and places the shift lever 15 in the D range during the time from t5 to t7 in FIG. 10. Furthermore, at time t5, the driver steers the steering wheel clockwise and releases his foot from the brake pedal. As a result, the vehicle 11 experiences a creep phenomenon, so that the vehicle 11 advances while turning, and stops at a position 6 at time t6. Furthermore, at time t6, the driver presses the accelerator pedal and turns the steering wheel counterclockwise. The driver then returns the steering wheel to its initial position (neutral position) at a prescribed time after time t6. Accordingly, the vehicle 11 advances along the road 51 and reaches a position 7 at time t7. The time from t5 to t7 in FIG. 10 is longer than the third time, and the shift lever 15 is positioned in the D range during the time from t5 to t7. Furthermore, during the time from t5 to t7, the vehicle speed of the vehicle 11 is larger than zero. Therefore, the determination unit 311 determines that the second D condition is established in step S21. In short, the determination unit 311 determines "Yes" in step S21 and proceeds to step S22.

The processing of step S22 is identical to that of step S15. It is determined whether the D-range hold time has elapsed since the shift lever 15 was moved to the D range at time t5. The time from t5 to t7 in FIG. 8 is longer than the D-range hold time. Accordingly, the determination unit 311 determines "Yes" in step S22, and proceeds to step S23. Note that the cumulative value of the clockwise (one-directional) turning angle of the vehicle 11 during the time from t1 to t6 is 170° as shown in FIG. 10. Moreover, at time t6, the driver steers the steering wheel counterclockwise. Therefore, the cumulative value of the clockwise (one-directional) turning angle of the vehicle 11 during the time from t1 to t7 changes to 90°. This means that the maximum cumulative value of the clockwise (one-directional) turning angle of the vehicle 11 during the time from t1 to t7 is 170°.

The processing of step S23 is identical to that of step S16. As described above, the maximum cumulative value of the clockwise (one-directional) turning angle of the vehicle 11 during the time from t1 to t7 is 170°. Accordingly, the determination unit 311 determines "Yes" in step S23 and proceeds to step S17.

In step S17, the determination unit 311 determines that vehicle 11 has executed the specific retreat operation. Then, the external server 30 performs the processes of steps S18, S19. Note that time t7 in FIG. 10 is the time when the first time ends. In this case, the external server 30 temporarily ends the processing of the flowchart in FIG. 16.

The (CPU of the) external server 30 further executes the processing shown in the flowchart in FIG. 17 whenever a prescribed time elapses. In this case, the external server 30 determines "Yes" in step S30, proceeds to step S31, and determines "Yes" in step S31. When the external server 30 further proceeds to step S32, the wireless communication device 31 controlled by the wireless control unit 313 transmits position information on the location of execution of the specific retreat operation determined to have been executed and information about date and time of the execution to the mobile terminal 20 (wireless communication device 21). In this case, the external server 30 temporarily ends the processing of the flowchart in FIG. 17.

Furthermore, the mobile terminal 20, in which the driving diagnostic application is active, executes the processing shown in the flowchart in FIG. 18 whenever a prescribed time elapses. In this case, the wireless control unit 211 of the mobile terminal 20 determines "Yes" in step S40 and proceeds to step S41, where the display 22 controlled by the display unit controller 212 displays the result of determination by the determination unit 311. In this case, the mobile terminal 20 temporarily ends the processing of the flowchart in FIG. 18.

Figure 11:
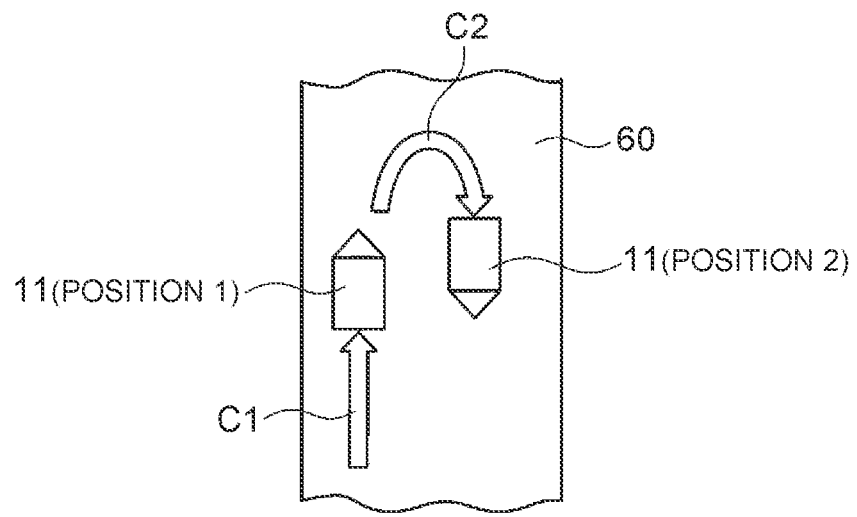
FIG. 11 is a schematic diagram showing the state when the vehicle executes a prescribed operation.

Case of FIG. 11

Description is now given of the case where the vehicle 11 executes the operation shown in FIG. 11. In the description below, the same operations (processing) as in the case of FIG. 7 are omitted.

The (CPU of the) external server 30 executes processing shown in the flowchart in FIG. 16 whenever a prescribed time elapses.

The vehicle 11 shown in FIG. 11 advances on a straight road 60 along arrow C1. In this case, the shift lever 15 is positioned in the D range. The vehicle 11 then makes a U-turn along arrow C2. Therefore, the vehicle 11 moves to a position 2 and then continues to advance.

When vehicle data is transmitted from the wireless communication device 13 to the wireless communication device 31, the external server 30 determines "Yes" in step S10 in FIG. 16 and proceeds to step S11. The time for the vehicle 11 to advance along arrows C1, C2 is longer than the third time, and the shift lever 15 is positioned in the D range when the vehicle 11 advances along arrows C1, C2. Therefore, the vehicle speed of the vehicle 11 at this time is larger than zero. Furthermore, at a prescribed time while the vehicle 11 advances along arrows C1, C2, the value of the determination start flag is set to "0". Therefore, the determination unit 311 determines that the first D condition is established in step S11. In short, the determination unit 311 determines "Yes" in step S11.

After ending the processing of step S12, the external server 30 proceeds to step S13. In this example, the shift lever 15 remains in the D range even after the elapse of the first time (e.g., two minutes) from the time to start counting of the first time in step S12 (start time). Therefore, the determination unit 311 determines "No" in step S13, sets the value of the determination start flag to "0" in step S24, and temporarily ends the processing of this routine.

Therefore, when the vehicle 11 advances on the road 60 shown in FIG. 11 along arrows C1, C2, the determination unit 311 does not determine that the specific retreat operation has been executed. As a consequence, the external server 30 determines "No" in step S31 of the flowchart in FIG. 17, and temporarily ends the processing of the flowchart in FIG. 17. Furthermore, the mobile terminal 20 determines "No" in step S40 in the flowchart of FIG. 18, and temporarily ends the processing of the flowchart in FIG. 18. Therefore, the display 22 of the mobile terminal 20 does not display the result of determination.

Figure 12:
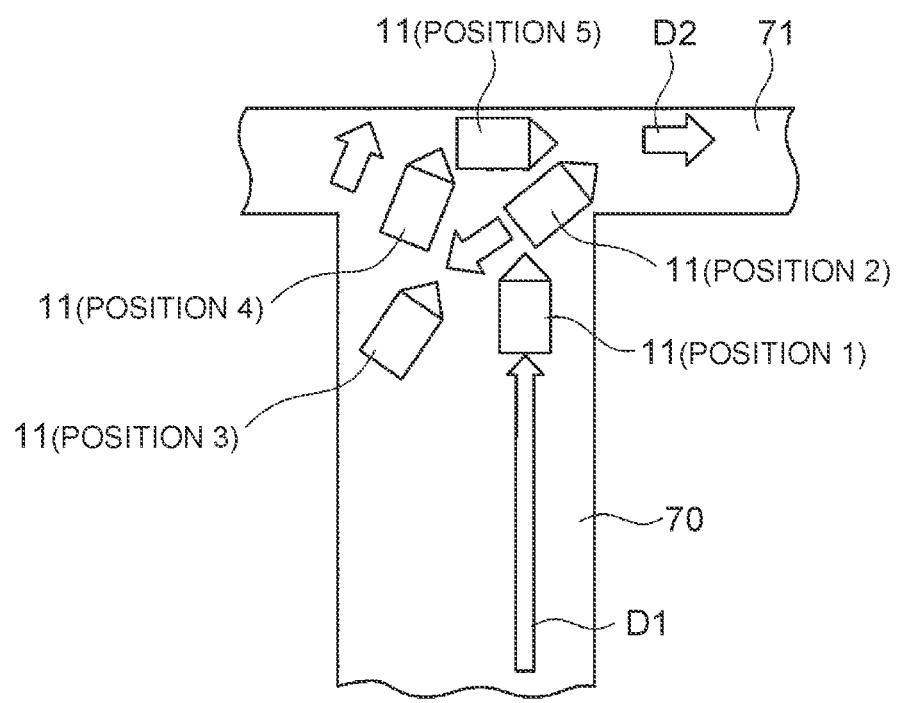
FIG. 12 is a schematic diagram showing the state when the vehicle executes a prescribed operation.

Case of FIG. 12

Description is now given of the case where the vehicle 11 executes the operation shown in FIG. 12. One end of a straight road 70 shown in FIG. 12 is connected to a straight road 71 crossing the road 70. In the description below, the same operations (processing) as in the case of FIGS. 7 and 11 are omitted.

The (CPU of the) external server 30 executes processing shown in the flowchart in FIG. 16 whenever a prescribed time elapses.

The vehicle 11 shown in FIG. 12 advances on the straight road 70 along arrow D1. In this case, the shift lever 15 is positioned in the D range. When the vehicle 11 reaches a position 1, the driver steers the steering wheel clockwise. Consequently, the vehicle 11 moves to a position 2 and stops at the position 2. Furthermore, at the position 2, the shift lever 15 is moved from the D range to the R range. Then, the driver steers the steering wheel and releases his foot from the brake pedal. As a result, the vehicle 11 experiences a creep phenomenon, so that the vehicle 11 retreats while turning, and stops at a position 3. At the position 3, the shift lever 15 is moved from the R range to the D range. The driver then presses the accelerator pedal while steering the steering wheel. Accordingly, the vehicle 11 reaches a position 5 after passing a position 4. Then, the steering wheel is returned to its initial position, and the vehicle 11 advances on the road 71 along arrow D2.

The time for the vehicle 11 to move from the position 2 to the position 3 is less than the third time. In other words, the time during which the shift lever 15 is positioned in the R range is less than the third time. This means that a return amount of the steering wheel when the vehicle 11 retreats from the position 2 to the position 3 is very small. Therefore, when the external server 30 which executes the processing of the flowchart in FIG. 16 proceeds to step S13, the determination unit 311 determines "No" in step S13. Therefore, in the case where the driver places the shift lever 15 in the R range only for less than the third time to slightly return the steering wheel when the vehicle 11 moves from the position 2 to the position 3 in FIG. 12, the determination unit 311 does not determine that the specific retreat operation has been executed. Therefore, the display 22 of the mobile terminal 20 does not display the result of determination.

Figure 13:
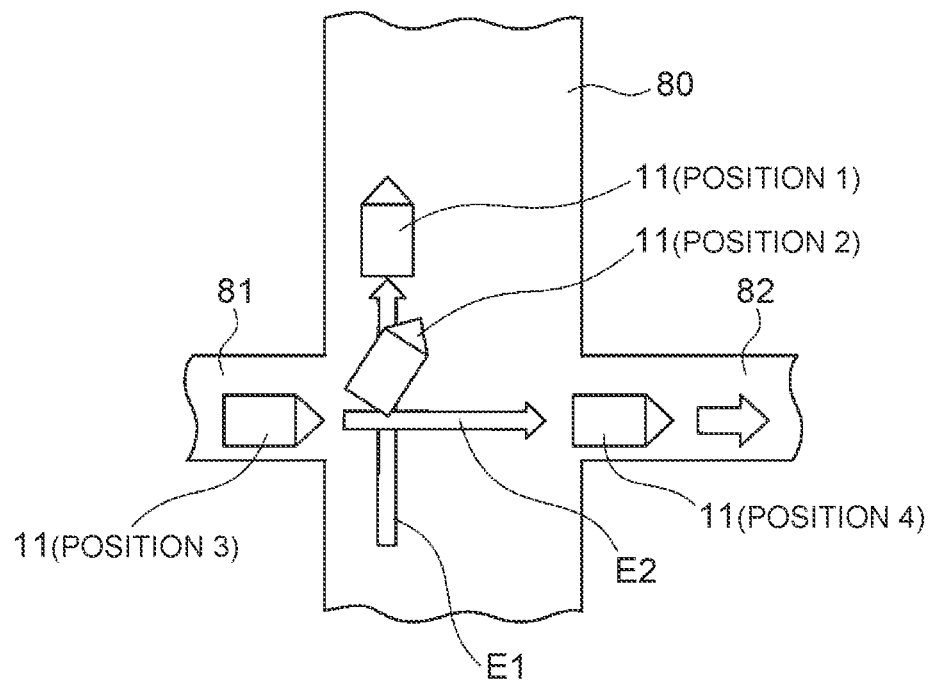
FIG. 13 is a schematic diagram showing the state when the vehicle executes a prescribed operation.

Case of FIG. 13

Description is now given of the case where the vehicle 11 executes the operation shown in FIG. 13. A straight road 80 shown in FIG. 13 has edge portions on both sides, and the edge portions are connected to respective one ends of straight roads 81, 82 which cross the road 80. In the description below, the same operations (processing) as in the case of FIGS. 7 and 11 are omitted.

The vehicle 11 shown in FIG. 13 advances on the straight road 80 along arrow E1. In this case, the shift lever 15 is positioned in the D range. When the vehicle 11 reaches a position 1, the vehicle 11 stops. At the position 1, the shift lever 15 is moved from the D range to the R range. Then, the driver steers the steering wheel counterclockwise and releases his foot from the brake pedal. As a result, the vehicle 11 experiences a creep phenomenon, so that the vehicle 11 retreats while turning, and stops at a position 3 after passing a position 2. Then, at the position 3, the steering wheel is returned to its initial position, and the shift lever 15 is moved from the R range to the D range. The driver then presses the accelerator pedal. Accordingly, the vehicle 11 advances on the roads 81, 80, 82 along arrow E2 and reaches a position 4.

As shown in FIG. 13, the maximum cumulative value of the clockwise (one-directional) turning angle of the vehicle 11 during the time in which the vehicle 11 moves from the position 1 to the position 4 is 90°. Accordingly, when the external server 30 which executes the processing of the flowchart in FIG. 16 proceeds to steps S16, S23, the determination unit 311 determines "No" in steps S16, S23. Therefore, when the vehicle 11 travels on the roads 80, 81, 82 as shown in FIG. 13, the determination unit 311 does not determine that the specific retreat operation has been executed. Therefore, the display 22 of the mobile terminal 20 does not display the result of determination.

Figure 14:
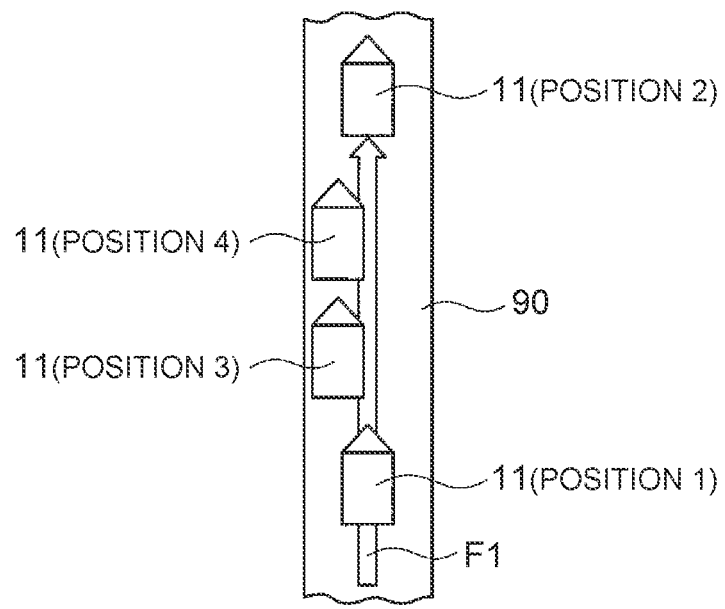
FIG. 14 is a schematic diagram showing the state when the vehicle executes a prescribed operation.

Case of FIG. 14

Description is now given of the case where the vehicle 11 executes the operation shown in FIG. 14. In the description below, the same operations (processing) as in the case of FIGS. 7 and 11 are omitted.

The vehicle 11 shown in FIG. 14 advances on a straight road 90 along arrow F1. In this case, the shift lever 15 is positioned in the D range. The vehicle 11 reaches a position 2 after passing a position 1, and stops at the position 2. At the position 2, the shift lever 15 is moved from the D range to the R range. Furthermore, the driver steers the steering wheel and releases his foot from the brake pedal. As a result, the vehicle 11 experiences a creep phenomenon, so that the vehicle 11 retreats while turning, and stops at a position 3 that is part of a side edge portion of the road 90. After the vehicle 11 stops at the position 3, the driver returns the steering wheel to its initial position and moves the shift lever 15 to the D range. Furthermore, the driver releases his foot from the brake pedal. Therefore, the vehicle 11 experiences a creep phenomenon, so that the vehicle 11 moves to a position 4 along the side edge portion of the road 90. After the vehicle 11 stops at the position 4, the driver moves the shift lever 15 to the P range. In short, the driver performs parallel parking of the vehicle 11 at the position 4.

In this case, as is clear from FIG. 14, the steering angle of the steering wheel when the vehicle 11 moves from the position 2 to the position 3 is a very small angle, and the maximum cumulative value of the turning angle of the vehicle 11 in one direction is less than the threshold value. Therefore, when the determination unit 311 of the external server 30 proceeds to step S16 in the flowchart of FIG. 16, the determination unit 311 determines "No" in step S16. Then, in this case, the shift lever 15 is moved to the P range, so that the determination unit 311 determines "No" in step S20. Therefore, when the vehicle 11 travels on the road 90 as shown in FIG. 14, the determination unit 311 does not determine that the specific retreat operation has been executed. Therefore, the display 22 of the mobile terminal 20 does not display the result of determination.

Figure 15:
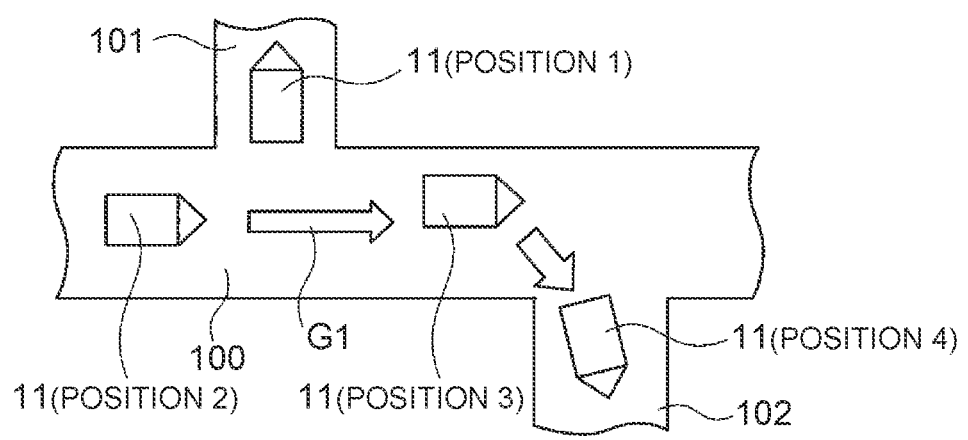
FIG. 15 is a schematic diagram showing the state when the vehicle executes a prescribed operation.

Case of FIG. 15

Description is now given of the case where the vehicle 11 executes the operation shown in FIG. 15. A parking space 101 is provided on one side edge portion of a straight road 100 shown in FIG. 15. The other side edge portion of the road 100 is connected to one end of a straight road 102 which crosses the road 100. In the description below, the same operations (processing) as in the case of FIGS. 7 and 11 are omitted.

The vehicle 11 shown in FIG. 15 is parked in the parking space 101 (position 1). In this case, the shift lever 15 of the vehicle 11 is positioned in the P range. At the position 1, the shift lever 15 is moved from the P range to the R range. Then, the driver steers the steering wheel counterclockwise and releases his foot from the brake pedal. As a result, the vehicle 11 experiences a creep phenomenon, so that the vehicle 11 retreats while turning, and stops at a position 2. When the vehicle 11 stops at the position 2, the shift lever 15 is moved from the R range to the D range. The driver then returns the steering wheel to its initial position and presses the accelerator pedal. Accordingly, the vehicle 11 advances on the road 100 along arrow G1 and reaches a position 3. When the vehicle 11 reaches the position 3, the driver steers the steering wheel clockwise. Therefore, the vehicle 11 moves to a position 4 on the road 102.

As shown in FIG. 15, the maximum cumulative value of the clockwise (one-directional) turning angle of the vehicle 11 during the time in which the vehicle 11 moves from the position 1 to the position 4 is generated at the position 4. The cumulative value of the turning angle at the position 4 is about 170°. In other words, the maximum cumulative value is equal to or more than the threshold value. However, when the vehicle 11 is in the position 1, the shift lever 15 is positioned in the P range. Therefore, when the external server 30 which executes the processing of the flowchart in FIG. 16 proceeds to step S11, the determination unit 311 determines "No" in step S11. Therefore, when the vehicle 11 travels through the parking space 101 and the roads 100, 102 as shown in FIG. 15, the determination unit 311 does not determine that the specific retreat operation has been executed. Therefore, the display 22 of the mobile terminal 20 does not display the result of determination.

As described in the foregoing, according to the system 10 and the vehicle behavior determination method in the present embodiment, when the determination unit 311 determines based on the detection value of the shift position sensor 16 that the shift position is switched in order of the D range, the R range, and the D range or in order of the D range, the R range, the D range, the R range, and the D range within the first time, and the maximum cumulative value of the turning angle of the vehicle 11 in one direction during a period between the start time and the end time of the first time, which is calculated by the turning angle calculation unit 121, is equal to or more than the threshold value, it is determined that the vehicle 11 has executed the specific retreat operation. Therefore, the system 10 and the vehicle behavior determination method in the present embodiment can determine whether the vehicle 11 has executed the specific retreat operation within the first time. Specifically, according to the system 10 and the vehicle behavior determination method in the present embodiment, when the vehicle 11 executes the operations in the case of FIGS. 7 and 9, it is determined that the vehicle 11 has executed the specific retreat operation. On the other hand, according to the system 10 and the vehicle behavior determination method in the present embodiment, when the vehicle 11 executes the operations in each case of FIGS. 11 to 15, it is not determined that the vehicle 11 has executed the specific retreat operation.

Moreover, a driver who has an intention to perform the specific retreat operation typically performs rear confirmation for a certain period of time (second time) after positioning the shift lever 15 in the R range. Therefore, when the driver moves the shift lever 15 to the R range, the vehicle speed is typically maintained at zero and the shift lever 15 is positioned in the R range for the second time. According to the system 10 and the vehicle behavior determination method of the present embodiment, it is determined whether the vehicle speed is zero and the shift lever 15 is positioned in the R range for the second time in steps S13, S20 in FIG. 16. Therefore, when the driver, who has no intention of performing the specific retreat operation, temporarily positions the shift lever 15 in the R range, it is less likely that the determination unit 311 erroneously determines that the vehicle 11 has performed the specific retreat operation.

Moreover, it is less likely that the determination unit 311 erroneously determines that the vehicle 11 has performed the specific retreat operation, when, for example, the driver turns the vehicle 11 (makes a turn) by a very small angle while positioning the shift lever 15 in the R range for a short period of time that is less than the third time. Therefore, in such a case, the system 10 and the vehicle behavior determination method in the present embodiment make it possible to determine whether the vehicle 11 has executed the specific retreat operation within the first time with a high accuracy.

Moreover, when the determination unit 311 determines that the vehicle 11 has executed the specific retreat operation while the vehicle 11 is in a travelable state, the display 22 of the mobile terminal 20 displays the result of determination by the determination unit 311. Therefore, the system 10 and the vehicle behavior determination method in the present embodiment can reduce the likelihood that the driver who views the display 22 executes the specific retreat operation thereafter.

Although the system 10 and the vehicle behavior determination method in the present embodiment have been described in the foregoing, the system 10 and the vehicle behavior determination method can be modified as appropriate without departing from the scope of the disclosure.

For example, when the shift lever 15 is moved between the P range and the D range within a prescribed fourth time, the determination unit 311 may not determine that the shift lever 15 is positioned in the R range in steps S13, S20. The fourth time is a short time. For example, the fourth time is one second. According to the modification, when a driver who has no intention of performing the specific retreat operation moves the shift lever 15 between the P range and the D range, the system 10 is less likely to erroneously determine that the vehicle 11 has performed the specific retreat operation.

The first time may be other than two minutes. For example, the first time may be one minute.

The second time may be other than three seconds. For example, the second time may be four seconds.

The third time may be other than five seconds. For example, the third time may be seven seconds.

The threshold value for the maximum cumulative value of the turning angle of the vehicle 11 may be other than 150°. In some embodiments, the threshold value may be set to any value between 150° and 180° (150° or more and 180° or less) in order to prevent the operation of the vehicle 11, including a retreat operation by steering the steering wheel by a very small angle, from being erroneously determined as the specific retreat operation. However, the threshold value may be an angle less than 150°. The threshold value may also be an angle larger than 180°. For example, the threshold value may be set to any angle equal to or larger than 90°.

Steps S20 to S23 may be removed from the flowchart in FIG. 16.

The flowchart in FIG. 16 may include a specific step group including steps S20 to S23, as the processing executed after "No" is determined in step S23. The flowchart in FIG. 16 may further include two or more specific step groups as the processing executed after "No" is determined in step S23.

In step S32, the wireless communication device 31 in the external server 30 may transmit position information on the location of execution of the specific retreat operation determined to have been executed and information about date and time of the execution to the wireless communication device 13. In this case, the ECU 12 displays the result of determination on the display 19.

The flowchart in FIG. 18 may be changed such that the mobile terminal 20 determines "Yes" in step S40 when the information about the count value, received by the wireless communication device 21 of the mobile terminal 20 in step S40, represents a prescribed plurality of number of times or more (for example, three times or more).

The ECU 12 of the vehicle 11 may have a function corresponding to the determination unit 311. In this case, the ECU 12 performs the processing of the flowchart in FIG. 16. In addition, when the ECU 12 performs the processing of step S19, the ECU 12 displays the result of determination on the display 19.

In step S41 of the flowchart in FIG. 18, a speaker controlled by the CPU of the mobile terminal 20 may output voice sound representing the result of determination. Similarly, in step S41, a speaker of the vehicle 11 controlled by the ECU 12 may output voice sound representing the result of determination.

The vehicle 11 may be an AT vehicle without the shift lever 15. For example, the vehicle 11 may be an AT vehicle with a button to change the shift position or a dial to change the shift position.

The vehicle 11 including the system 10 may be a manual vehicle (MT vehicle). For example, the vehicle 11 may include a shift lever that can be moved to advance positions (for example, first gear to fifth gear), a reverse position (reverse), and a neutral position, and a shift position sensor that detects the shift position of the shift lever.

The vehicle 11 may include a receiver that can receive information from satellites (for example, Galileo) in a global navigation satellite system other than GPS, in place of the GPS receiver 14.

What is claimed is:

1. A vehicle behavior determination system, comprising:
a shift position sensor configured to detect a shift position of a vehicle;
a yaw rate sensor configured to detect a yaw rate of the vehicle;
a turning angle calculation unit configured to calculate, based on the yaw rate during a period between a start time and an end time of a first time, a turning angle of the vehicle in a plan view during the period between the start time and the end time; and
a determination unit configured to determine that the vehicle has executed a specific retreat operation, when it is determined that the shift position has been switched in order of an advance position, a reverse position, and the advance position within the first time based on a detection value of the shift position sensor, and a maximum cumulative value of the turning angle of the vehicle in one direction during the period between the start time and the end time, calculated by the turning angle calculation unit, is equal to or more than a threshold value.

2. The vehicle behavior determination system according to claim 1, wherein the threshold value is a value from 150° to 180°.

3. The vehicle behavior determination system according to claim 1, wherein the determination unit determines that the shift position is in the reverse position when the shift position sensor detects that the shift position is in the reverse position and a vehicle speed of the vehicle is zero for a second time.

4. The vehicle behavior determination system according to claim 1, wherein the determination unit determines that the shift position is in the reverse position when the shift position sensor detects that the shift position is in the reverse position for a third time.

5. The vehicle behavior determination system according to claim 1, wherein the determination unit does not determine that the shift position is in an R range corresponding to the reverse position, when the vehicle is an automatic vehicle, the R range is located between a D range corresponding to the advance position and a P range, and the shift position is moved between the P range and the D range within a fourth time.

6. The vehicle behavior determination system according to claim 1, comprising a notification unit configured to notify a result of determination to a driver of the vehicle, when the determination unit determines that the vehicle has executed the specific retreat operation a prescribed number of times or more while the vehicle is in a travelable state.

7. A vehicle behavior determination method, comprising the steps of:
detecting, by a shift position sensor, a shift position of a vehicle;
detecting, by a yaw rate sensor, a yaw rate of the vehicle;
calculating, by an electronic control unit, based on the yaw rate during a period between a start time and an end time of a first time, a turning angle of the vehicle in a plan view during the period between the start time and the end time;
calculating, by the electronic control unit, a maximum cumulative value of the turning angle of the vehicle in one direction during the period between the start time and the end time; and
determining, by the electronic control unit, that the vehicle has executed a specific retreat operation, when it is determined that the shift position has been switched in order of an advance position, a reverse position, and the advance position within the first time based on a detection value of the shift position sensor, and the calculated maximum cumulative value of the turning angle of the vehicle in one direction during the period between the start time and the end time is equal to or more than a threshold value.

8. The vehicle behavior determination method according to claim 7, wherein the threshold value is a value from 150° to 180°.

9. The vehicle behavior determination method according to claim 7, wherein the electronic control unit determines that the shift position is in the reverse position when the shift position sensor detects that the shift position is in the reverse position and a vehicle speed of the vehicle is zero for a second time.

10. The vehicle behavior determination method according to claim 7, wherein the electronic control unit determines that the shift position is in the reverse position when the shift position sensor detects that the shift position is in the reverse position for a third time.

11. The vehicle behavior determination method according to claim 7, wherein the electronic control unit does not determine that the shift position is in an R range corresponding to the reverse position, when the vehicle is an automatic vehicle, the R range is located between a D range corresponding to the advance position and a P range, and the shift position is moved between the P range and the D range within a fourth time.

12. The vehicle behavior determination method according to claim 7 further comprising:
notifying, by a display, a result of determination to a driver of the vehicle, when the electronic control unit determines that the vehicle has executed the specific retreat operation a prescribed number of times or more while the vehicle is in a travelable state.

13. A vehicle behavior determination system, comprising:
a shift position sensor configured to detect a shift position of a vehicle;
a yaw rate sensor configured to detect a yaw rate of the vehicle; and
an electronic control unit configured to:
calculate, based on the yaw rate during a period between a start time and an end time of a first time, a turning angle of the vehicle in a plan view during the period between the start time and the end time;
calculated a maximum cumulative value of the turning angle of the vehicle in one direction during the period between the start time and the end time; and
determine that the vehicle has executed a specific retreat operation, when it is determined that the shift position has been switched in order of an advance position, a reverse position, and the advance position within the first time based on a detection value of the shift position sensor, and the maximum cumulative is equal to or more than a threshold value.

14. The vehicle behavior determination system according to claim 13, wherein the threshold value is a value from 150° to 180°.

15. The vehicle behavior determination system according to claim 13, wherein the electronic control unit determines that the shift position is in the reverse position when the shift position sensor detects that the shift position is in the reverse position and a vehicle speed of the vehicle is zero for a second time.

16. The vehicle behavior determination system according to claim 13, wherein the electronic control unit determines that the shift position is in the reverse position when the shift position sensor detects that the shift position is in the reverse position for a third time.

17. The vehicle behavior determination system according to claim 13, wherein the electronic control unit does not determine that the shift position is in an R range corresponding to the reverse position, when the vehicle is an automatic vehicle, the R range is located between a D range corresponding to the advance position and a P range, and the shift position is moved between the P range and the D range within a fourth time.

18. The vehicle behavior determination system according to claim 13, comprising a display configured to notify a result of determination to a driver of the vehicle, when the electronic control unit determines that the vehicle has executed the specific retreat operation a prescribed number of times or more while the vehicle is in a travelable state.

\* \* \* \* \*